United States Patent
Ogawa et al.

(10) Patent No.: US 11,088,588 B2
(45) Date of Patent: Aug. 10, 2021

(54) MOTOR WITH AN UPPER BEARING INCLUDING A WASHER, A LOWER BEARING, AND BEARING HOLDING PORTIONS

(71) Applicant: Nidec Corporation, Kyoto (JP)

(72) Inventors: Kosuke Ogawa, Kyoto (JP); Takashi Hattori, Kyoto (JP); Takashi Seguchi, Kyoto (JP); Shunsuke Murakami, Kyoto (JP); Takao Atarashi, Kyoto (JP); Yoshiaki Yamashita, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 711 days.

(21) Appl. No.: 15/767,714

(22) PCT Filed: Oct. 6, 2016

(86) PCT No.: PCT/JP2016/079759
§ 371 (c)(1),
(2) Date: Apr. 12, 2018

(87) PCT Pub. No.: WO2017/026550
PCT Pub. Date: Feb. 16, 2017

(65) Prior Publication Data
US 2018/0316239 A1 Nov. 1, 2018

(30) Foreign Application Priority Data

Aug. 10, 2015 (JP) .............................. JP2015-158391
Nov. 6, 2015 (JP) .............................. JP2015-218473

(51) Int. Cl.
*H02K 5/00* (2006.01)
*H02K 5/173* (2006.01)
(Continued)

(52) U.S. Cl.
CPC ............. *H02K 5/1732* (2013.01); *H02K 3/50* (2013.01); *H02K 3/522* (2013.01); *H02K 11/30* (2016.01);
(Continued)

(58) Field of Classification Search
CPC ...... B62D 5/0421; F16C 25/083; F16C 25/08; F16C 19/54; H02K 5/1732; H02K 7/083;
(Continued)

(56) References Cited

U.S. PATENT DOCUMENTS 2,700,540 A * 1/1955 Dejuhasz ................ F16F 1/042
267/180
4,237,741 A * 12/1980 Huf ......................... F01B 1/062
74/49

(Continued)

FOREIGN PATENT DOCUMENTS

| CN | 1370258 A | 9/2002 |
|----|-----------|--------|
| CN | 103118923 A | 5/2013 |

(Continued)

OTHER PUBLICATIONS

Official Communication issued in Japanese Patent Application No. 2017-534505, dated Mar. 16, 2020.

(Continued)

*Primary Examiner* — Maged M Almawri
(74) *Attorney, Agent, or Firm* — Keating & Bennett (57) ABSTRACT

A motor includes a rotor that includes a shaft centered on a central axis extending in an upward and downward direction; a stator that is disposed to face the rotor in a radial direction; a bearing that supports the shaft; a bearing holder that holds the bearing; and a housing that accommodates the rotor, the stator, and the bearing holder, and opens to an upper side. The housing includes a controller accommodating region that accommodates at least a portion of a con- (Continued)

troller electrically connected to the stator on an upper side from the bearing holder. An inner diameter of the housing in the controller accommodating region is larger than an inner diameter of the housing at a position to which the bearing holder is attached. The bearing holder is held on an inner peripheral surface of the housing by interference fitting.

22 Claims, 5 Drawing Sheets (51) Int. Cl.
*H02K 11/33* (2016.01)
*H02K 3/52* (2006.01)
*H02K 3/50* (2006.01)
*H02K 11/30* (2016.01)

(52) U.S. Cl.
CPC ......... *H02K 11/33* (2016.01); *H02K 2203/09* (2013.01); *H02K 2211/03* (2013.01)

(58) Field of Classification Search
CPC ...... H02K 7/06; H02K 2213/03; H02K 11/30; H02K 11/33; H02K 3/50; H02K 3/522; H02K 2211/03; H02K 2203/09
USPC ........... 310/90, 91, 90.5, 425, 68 R; 267/167
See application file for complete search history.

(56) References Cited

U.S. PATENT DOCUMENTS

| | | | |
|---|---|---|---|
| 5,831,360 A | 11/1998 | Senjo et al. | |
| 6,257,767 B1 | 7/2001 | Borcherding et al. | |
| 6,388,351 B1* | 5/2002 | Fisher | H02K 5/1732 310/90 |
| 8,998,189 B2* | 4/2015 | Toyama | B62D 5/0409 267/164 |
| 9,102,351 B2* | 8/2015 | Ishii | B62D 5/0409 |
| 9,893,586 B2* | 2/2018 | Tomizawa | H02K 5/225 |
| 9,948,156 B2* | 4/2018 | Anderson | H02K 5/15 |
| 10,305,344 B2* | 5/2019 | Fujisaki | H02K 5/1732 |
| 10,424,994 B2* | 9/2019 | Kabune | H02K 11/30 |
| 10,435,061 B2* | 10/2019 | Taniguchi | H02K 5/1732 |
| 2002/0121401 A1* | 9/2002 | Shimizu | F16C 39/02 180/444 |
| 2005/0012421 A1* | 1/2005 | Fukuda | H02K 3/28 310/179 |
| 2005/0103579 A1* | 5/2005 | Meernik | F16B 7/14 188/67 |
| 2013/0140964 A1* | 6/2013 | Matsunaga | F16C 25/083 310/68 B |
| 2014/0339966 A1* | 11/2014 | Tomizawa | H02K 5/22 310/68 D |
| 2015/0108877 A1 | 4/2015 | Sato et al. | |
| 2015/0176670 A1* | 6/2015 | Laszlo | F16C 23/08 267/165 |
| 2015/0381009 A1* | 12/2015 | Anderson | A01D 34/00 310/68 R |
| 2016/0013697 A1* | 1/2016 | Haga | H02K 3/28 310/71 |

FOREIGN PATENT DOCUMENTS

| | | |
|---|---|---|
| DE | 10 2010 030 373 A1 | 12/2011 |
| JP | 62-147925 A | 7/1987 |
| JP | 08-103049 A | 4/1996 |
| JP | 08-276843 A | 10/1996 |
| JP | 2001-327116 A | 11/2001 |
| JP | 2002-339965 A | 11/2002 |
| JP | 2003-309903 A | 10/2003 |
| JP | 2004-064832 A | 2/2004 |
| JP | 2010-154705 A | 7/2010 |
| JP | 2013-085750 A | 5/2013 |
| JP | 2013-090376 A | 5/2013 |
| JP | 2013-128390 A | 6/2013 |
| JP | 5693693 B1 | 4/2015 |

OTHER PUBLICATIONS

Official Communication issued in Chinese Patent Application No. 201680059363.X, dated Mar. 6, 2020.

Official Communication issued in International Patent Application No. PCT/JP2016/079759, dated Dec. 20, 2016.

English translation of Official Communication issued in corresponding Japanese Patent Application No. 2017-534505, dated Aug. 25, 2020.

* cited by examiner

MOTOR WITH AN UPPER BEARING INCLUDING A WASHER, A LOWER BEARING, AND BEARING HOLDING PORTIONS

BACKGROUND OF THE INVENTION

1. Field of the Invention

The present disclosure relates to a motor.

2. Description of the Related Art

There is known a motor in which a motor case that accommodates the motor and an accommodating member that accommodates a controller are coupled and integrated with one another.

In a case where a motor case and the accommodating member are coupled, the number of components increases and it is difficult to reduce the size. Therefore, it is conceivable to extend the motor case and accommodate the controller and the motor in a common motor case. In the configuration, the motor case is lengthened in an axial direction by a region for accommodating the controller. Therefore, it is difficult to insert each component configuring the motor into the motor case. Particularly, a stator that is fixed to an inner peripheral surface of the motor case and a bearing holder that holds a bearing are inserted through the region in which the controller is disposed in the motor case, so that an inner peripheral surface of the motor case is likely to be damaged and it is difficult to manufacture the motor.

SUMMARY OF THE INVENTION

A motor according to a preferred embodiment of the present invention is a motor that is used to transmit a predetermined torque to an external driving mechanism. The motor includes a rotor that includes a shaft centered on a central axis extending in an upward and downward direction; a stator that is disposed to face the rotor in a radial direction; an upper bearing that supports an upper side of the shaft; a lower bearing that supports a lower side of the shaft; a bearing holder that holds the upper bearing; and a housing that accommodates the rotor, the stator, and the bearing holder, and opens to an upper side. A lower end of the shaft projects to an outside from the housing and is used to transmit a predetermined torque to the external driving mechanism. The housing includes a housing cylinder portion that accommodates the rotor, the stator, and the bearing holder, a housing bottom portion that closes an opening of the housing cylinder portion on a lower side, and a housing shelf surface that faces an opening side of the housing and extends in a circumferential direction in an inner peripheral surface of the housing cylinder portion. The housing cylinder portion includes a controller accommodating region that accommodates at least a portion of a controller electrically connected to the stator on an upper side from the bearing holder. The bearing holder includes an upper bearing holding portion that is held on the inner peripheral surface of the housing cylinder portion, is in contact with the housing shelf surface, and holds the upper bearing. The upper bearing holding portion includes an upper bearing cylinder portion that fits to an outer ring of the upper bearing, and an upper bearing receiving portion that extends to an inside in the radial direction on an upper side of the upper bearing cylinder portion. The housing bottom portion includes a lower bearing holding portion that holds the lower bearing.

In the upper bearing, an inner ring of the upper bearing is fixed to the shaft, the outer ring of the upper bearing moves in the upward and downward direction with respect to the upper bearing holding portion, and an urging member that performs urging in the upward and downward direction is positioned between an upper surface of the outer ring and the upper bearing receiving portion. In the lower bearing, an inner ring of the lower bearing is fixed to the shaft, and an outer ring of the lower bearing is fixed to the lower bearing holding portion.

A motor according to another preferred embodiment of the present invention includes a rotor that includes a shaft centered on a central axis extending in an upward and downward direction; a stator that is disposed to face the rotor in a radial direction; a bearing that supports an shaft; a bearing holder that holds the bearing; and a housing that accommodates the rotor, the stator, and the bearing holder, and opens to an upper side. The housing includes a controller accommodating region that accommodates at least a portion of a controller electrically connected to the stator on an upper side from the bearing holder, and a shelf surface that faces an opening portion of the housing and extends in a circumferential direction in an inner surface of the housing. An inner diameter of the housing in the controller accommodating region is larger than an inner diameter of the housing at a position to which the bearing holder is attached. The bearing holder is in contact with the shelf surface and includes a recessed portion and a pressing portion that is positioned on an outside of the recessed portion in the radial direction and presses the inner peripheral surface of the housing at an outer edge portion of an upper surface of the bearing holder.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the disclosure will be described with reference to the drawings.

In the following description, a direction in which a central axis J extends is an upward and downward direction. However, the upward and downward direction in the present specification is simply a name used for explanation and does not limit an actual positional relationship and direction of the motors with respect to gravity when installed. In addition, unless otherwise specified, a direction parallel or substantially parallel to the central axis J is simply referred to as an "axial direction", a radial direction centered on the central axis J is simply referred to as a "radial direction", and a circumferential direction centered on the central axis J (centered on the axis of the central axis J) is simply referred to as a "circumferential direction".

Moreover, in the present specification, the term extending in the axial direction not only includes a case of strictly extending in the axial direction but also includes a case of extending in a direction inclined in a range of less than about 45 degrees with respect to the axial direction. Moreover, in the present specification, the term extending in the radial direction not only includes a case of strictly extending in the radial direction, that is, extending in a direction perpendicular or substantially perpendicular to the axial direction but also includes a case of extending in a direction inclined in a range of less than about 45 degrees with respect to the radial direction.

Figure 1:
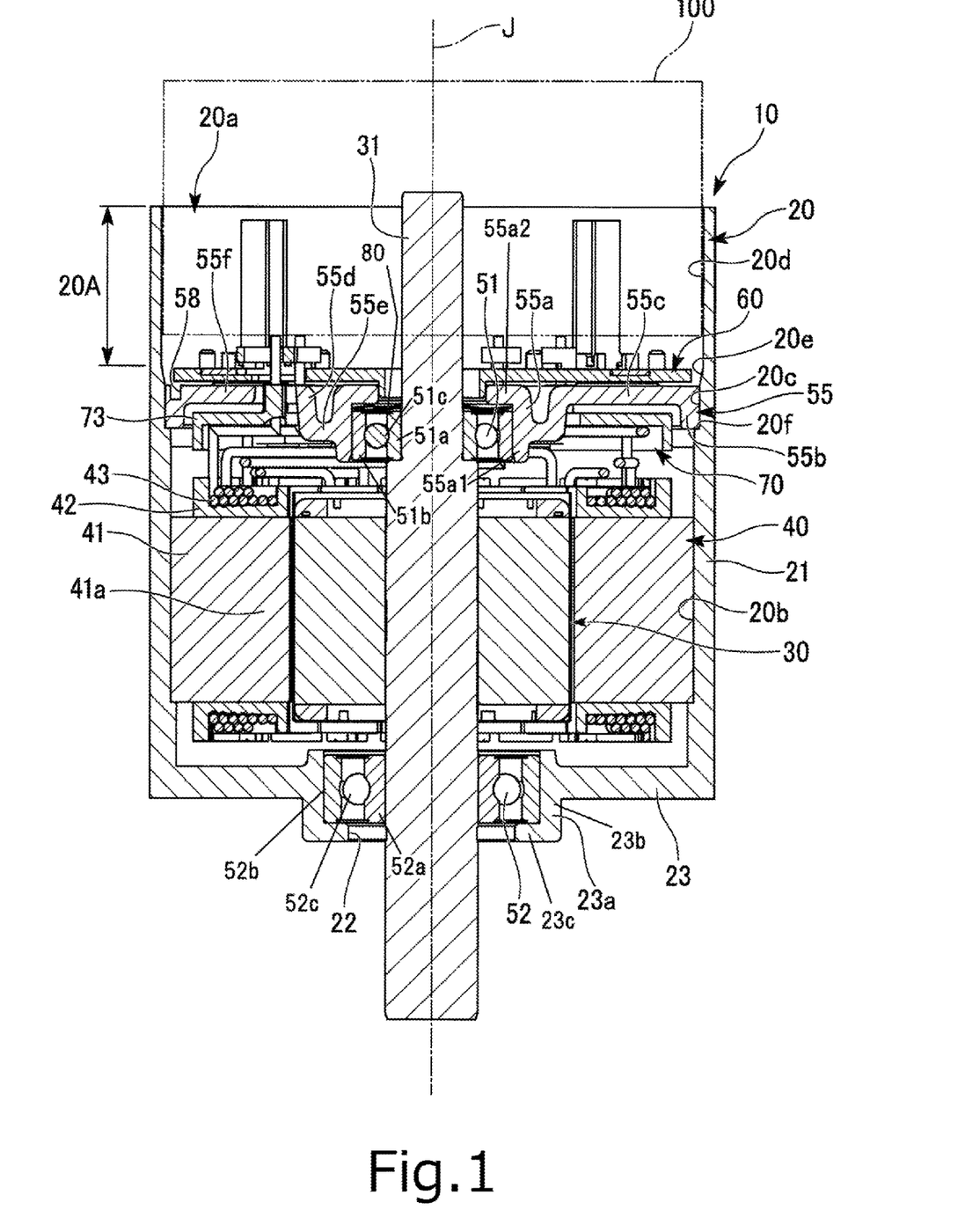
FIG. 1 is a sectional view illustrating a motor of a preferred embodiment of the present invention.
Figure 2:
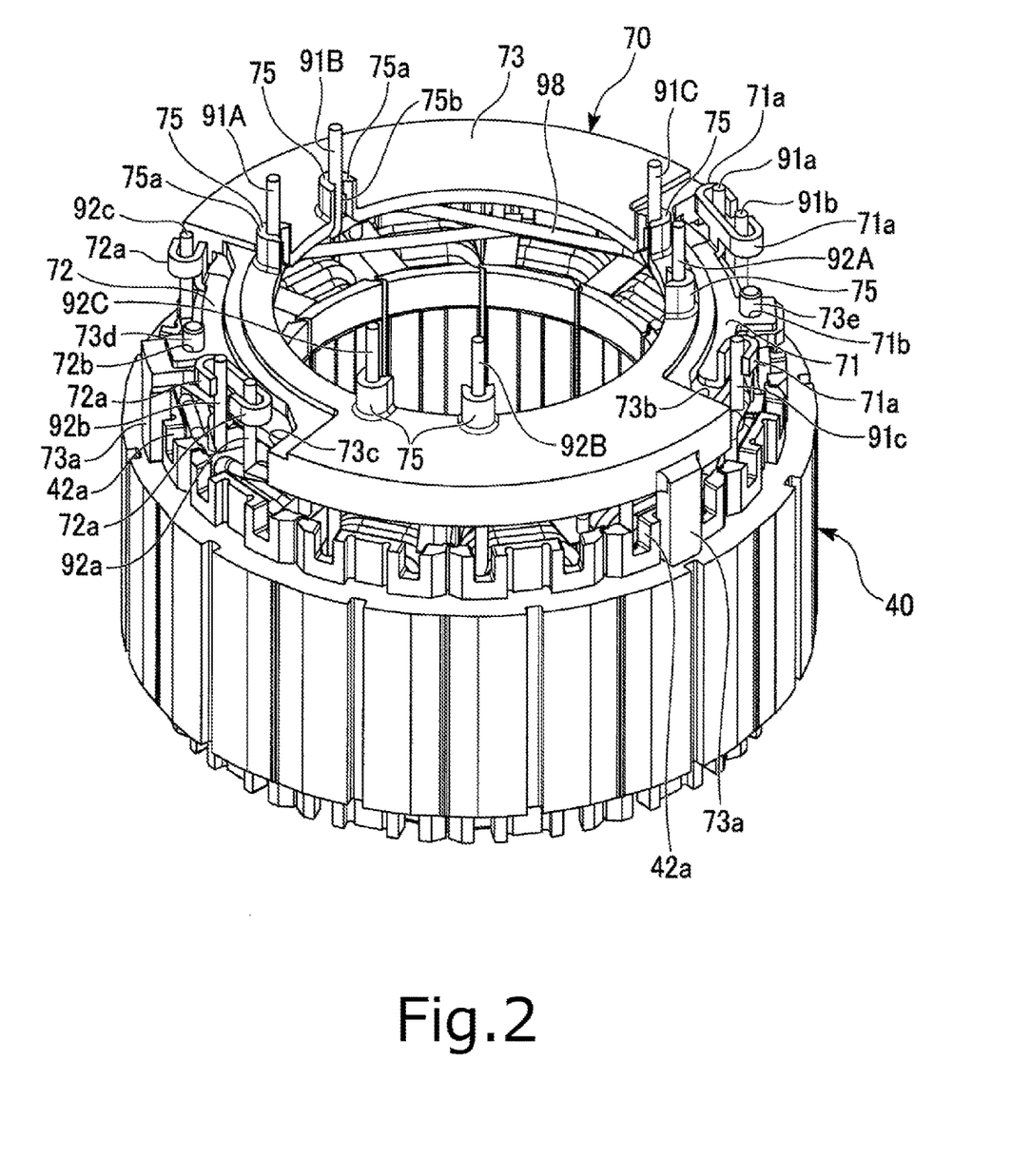
FIG. 2 is a perspective view illustrating a wire support member and a stator in the motor of FIG. 1.
Figure 3:
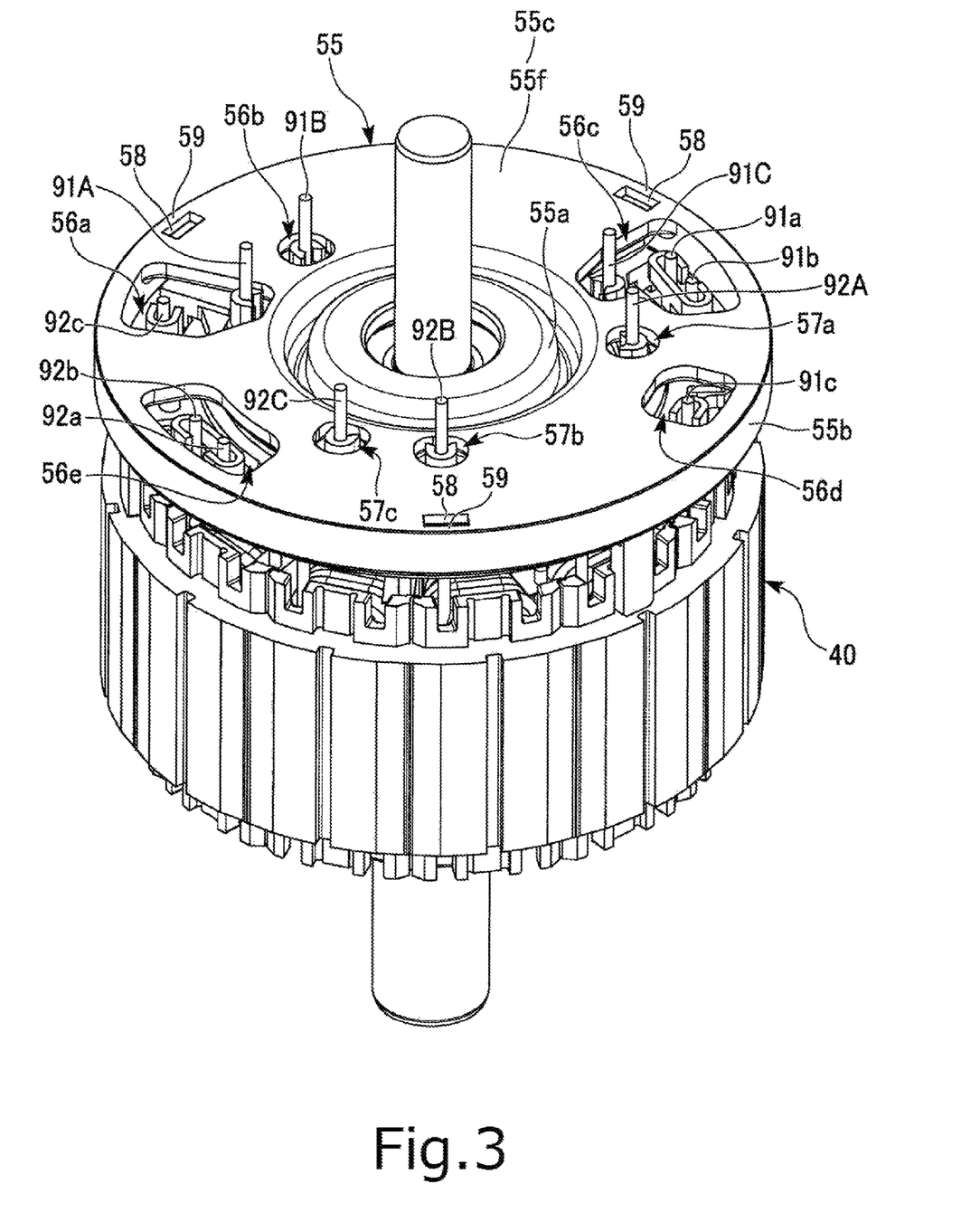
FIG. 3 is a perspective view illustrating a bearing holder and a stator assembly in the motor of FIG. 1.
Figure 4:
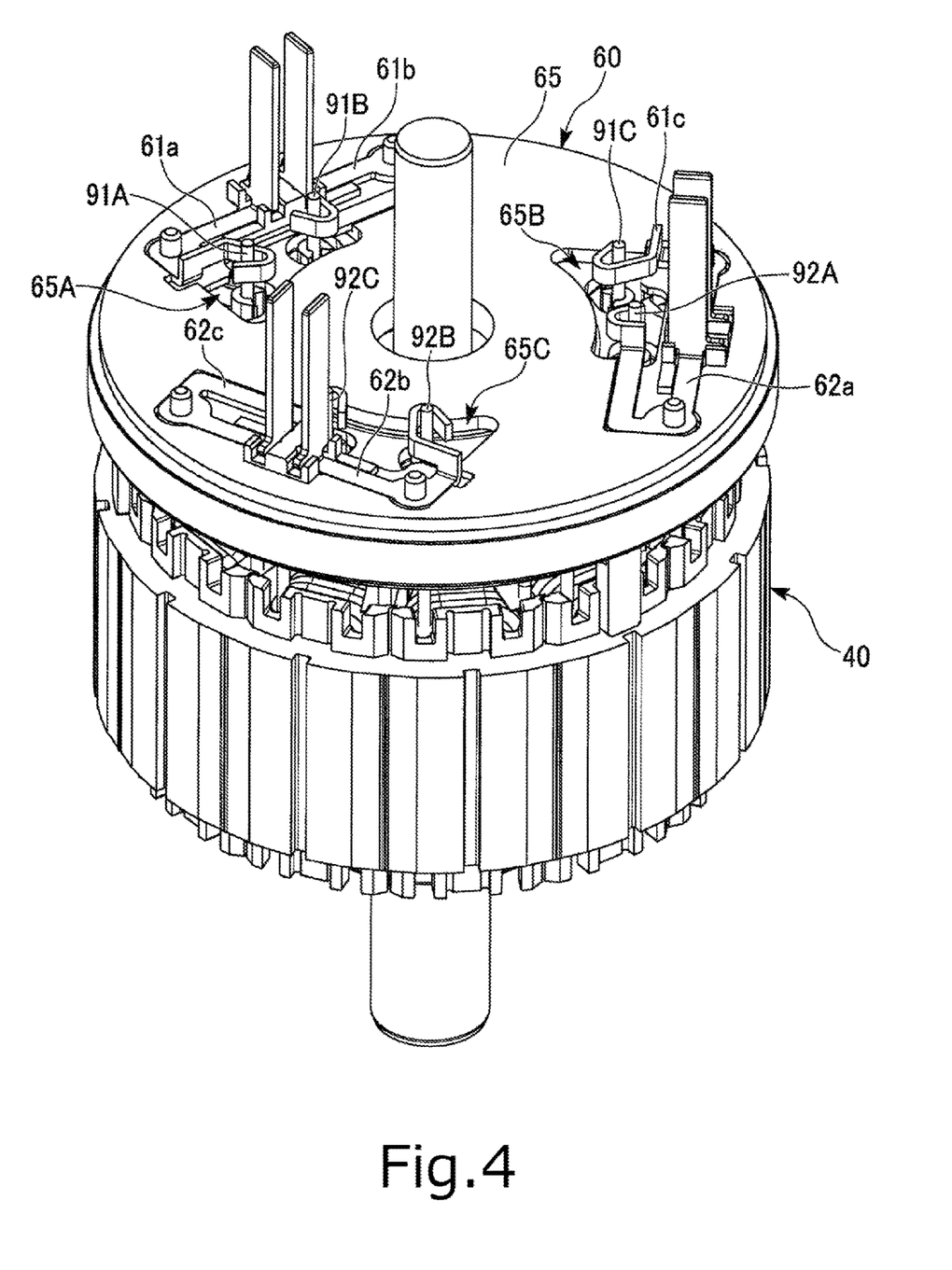
FIG. 4 is a perspective view illustrating a bus bar assembly and the stator assembly in the motor of FIG. 1.

FIG. 1 is a sectional view illustrating a motor 10 of a preferred embodiment of the present invention. FIG. 2 is a perspective view illustrating a wire support member and a stator. FIG. 3 is a perspective view illustrating a bearing holder and a stator assembly. FIG. 4 is a perspective view illustrating a bus bar assembly and the stator assembly.

The motor 10 is preferably used to transmit a predetermined torque to an external driving mechanism. The motor 10 preferably includes a housing 20, a rotor 30, a stator 40, a wire support member 70, a bearing holder 55, an upper bearing 51, a lower bearing 52, and a bus bar assembly 60. The bus bar assembly 60, the bearing holder 55, the wire support member 70, and the stator 40 are arranged in this order from the upper side to the lower side in the motor 10. The motor 10 includes a controller accommodating region 20A that accommodates at least a portion of a controller 100 on the upper side of the bus bar assembly 60.

The housing 20 preferably includes a cylinder portion 21 (housing cylinder portion) extending in an upward and downward direction, a bottom wall portion 23 (housing bottom wall portion) that is positioned at a lower end of the cylinder portion 21, and an opening portion 20a that opens to an upper side. The stator 40 and the bearing holder 55 are fixed to an inner surface of the housing 20.

The cylinder portion 21 has a cylindrical shape centered on the central axis J. The cylinder portion 21 includes an inner peripheral surface 20b that holds the stator 40, an inner peripheral surface 20c that holds the bearing holder 55, and an inner peripheral surface 20d of the controller accommodating region 20A that accommodates a portion of the controller 100. An inner diameter of the inner peripheral surface 20d is larger than an inner diameter of the inner peripheral surface 20c. The inner diameter of the inner peripheral surface 20c is larger than an inner diameter of the inner peripheral surface 20b. That is, the housing 20 has an inner surface shape in which the inner diameter decreases from the opening portion 20a toward a back side (bottom wall portion 23 side).

The housing 20 preferably includes an inclined surface 20e that connects the inner peripheral surface 20c and the inner peripheral surface 20d having different the inner diameters. A surface shape of the inclined surface 20e has a smaller inner diameter as it extends to the lower side in the axial direction. That is, it is preferable that a cross-sectional shape of the inclined surface 20e is linear or curved. Therefore, an assembling operator or the like (assembling operator or assembling device) is able to smoothly dispose the bearing holder 55 inserted downward from the opening portion 20a to an attachment position (inner peripheral surface 20c).

Moreover, the housing 20 may not necessarily have the inclined surface 20e. For example, the housing 20 may alternatively have a configuration in which the inner peripheral surface 20c and the inner peripheral surface 20d are connected via a step portion.

The housing 20 preferably includes a shelf surface 20f (housing shelf surface) that faces the opening portion 20a and extends in the circumferential direction between the inner peripheral surface 20b and the inner peripheral surface 20c. The shelf surface 20f is a receiving surface that is in contact with the bearing holder 55 and supports the bearing holder 55 in the axial direction. With the configuration, the housing 20 easily positions the bearing holder 55 in the axial direction and it is easy to obtain a perpendicular angle with respect to the axial direction. Therefore, it is possible to hold the bearing holder 55 with high accuracy.

The shape of the cylinder portion 21 is not limited to the cylindrical shape. An outer shape of the cylinder portion 21 may be, for example, a box shape as long as the cylinder portion 21 has a shape capable of holding the stator 40 and the bearing holder 55 on the inner peripheral surface. In addition, the outer shape of the cylinder portion 21 may be a combination of the cylindrical shape and the box shape. The stator 40 or the bearing holder 55 may be held at a portion of the inner surface of the cylinder portion 21 in the axial direction.

The bottom wall portion 23 preferably includes a lower bearing holding portion 23a that is disposed on the lower side of the stator 40 and holds the lower bearing 52, and an output shaft hole 22 that penetrates the bottom wall portion 23 in the axial direction.

The rotor 30 includes a shaft 31. The shaft 31 is centered on the central axis J extending in the upward and downward direction. The rotor 30 rotates around the central axis J together with the shaft 31. An end portion of the shaft 31 on the lower side protrudes to the lower side of the housing 20 via the output shaft hole 22. A lower end of the shaft 31 is provided with a power transmission assembly (not illustrated) such as, for example, a gear to transmit power, a pulley, etc. A torque of the motor 10 is transmitted to the external driving mechanism via the power transmission assembly.

The upper bearing 51 and the lower bearing 52 support the shaft 31 so as to be rotatable around the central axis. In a size of the bearing, since the lower bearing 52 is larger than the upper bearing 51, the lower bearing 52 is superior in performance in a load capacity. The lower bearing 52 is held by the lower bearing holding portion 23a on the lower side of the stator 40.

The lower bearing holding portion 23a includes a cylinder portion 23b (lower bearing cylinder portion) that fits to the outer peripheral surface of the lower bearing 52 and a receiving portion 23c (first lower bearing receiving portion) that extends from the lower side of the cylinder portion 23b to the inside in the radial direction. An inner ring 52a of the lower bearing 52 is fixed to the shaft 31 by press fitting. A lower surface of an outer ring 52b of the lower bearing 52 is in contact with the receiving portion 23c so that the outer ring 52b is fixed to the cylinder portion 23b by press fitting, for example. Furthermore, an upper end of the cylinder portion 23b is preferably partially caulked to the inside in the radial direction and the outer ring 52b is pinched by the receiving portion 23c to be firmly fixed. The upper bearing 51 is held by the bearing holder 55 on the upper side of the stator 40. Details of the bearing holder 55 will be described later.

The stator 40 is positioned on an outside of the rotor 30 in the radial direction. The stator 40 preferably includes a stator core 41, an insulator 42, and a coil 43. The insulator 42 is attached to teeth 41a of the stator core 41. The coil 43 includes a conductor wound around the insulator 42 and is disposed on each of the teeth 41a. The outer peripheral surface of the stator 40 is fixed to the inner peripheral surface 20b of the housing 20.

As illustrated in FIGS. 1 and 2, the wire support member 70 preferably includes a first conductive member 71, a second conductive member 72, a plurality (six in the present example) of wire holding portions 75, and a main body 73. The wire support member 70 is disposed on the stator 40. The stator assembly includes the wire support member 70 and the stator 40. A so-called neutral point of a coil is connected to the first and second conductive members 71 and 72. In the following description, the first conductive member 71 and the second conductive member 72 are respectively referred to as a first neutral point bus bar 71 and a second neutral point bus bar 72.

The main body 73 is annular and is disposed on the upper side of the stator 40. The main body 73 preferably includes a plurality of leg portions 73a extending to the lower side in the axial direction. The leg portion 73a is fitted into an attaching groove 42a of the insulator 42 so that the wire support member 70 is supported on the stator 40. The main body 73 is made of an insulating material such as resin.

The wire holding portion 75 is disposed at an inner peripheral edge of the main body 73. The wire holding portion 75 includes a support wall portion 75a that projects upward from the main body 73 and a recessed portion 75b that opens to an inside of the support wall portion 75a in the radial direction. Six wire holding portions 75 are disposed in three positions by two at every 120° in the circumferential direction, for example. Moreover, the wire holding portions 75 can also be disposed an outer peripheral edge of the main body 73. The arrangement and the number of the wire holding portions 75 can be appropriately changed in consideration of the number of coil lead wires, a lead out position of the coil lead wire, or the like.

The main body 73 preferably includes notches 73b and 73c having a fan shape in plan view. The notches 73b and 73c are disposed at two places on the outer peripheral portion of the main body 73. The first neutral point bus bar 71 and the second neutral point bus bar 72 respectively have three U-shaped connecting terminals 71a and 72a, and one through holes 71b and 72b. The first neutral point bus bar 71 and the second neutral point bus bar 72 are disposed on the outer periphery side of the main body 73 from the wire holding portion 75. The first neutral point bus bar 71 and the second neutral point bus bar 72 are exposed from the notches 73b and 73c viewed from the axial direction. The main body 73 includes projection portions 73d and 73e projecting in the axial direction. The projection portions 73d and 73e are disposed on the outer periphery side of the main body 73. Positions of the projection portions 73d and 73e in the circumferential direction are the same as the positions of the notches 73b and 73c in the circumferential direction. The projection portions 73d and 73e are fitted into the through holes 71b and 72b of the first neutral point bus bar 71 and the second neutral point bus bar 72 and then heated, melted, and solidified. Therefore, the first neutral point bus bar 71 and the second neutral point bus bar 72 are fixed to the main body 73. Moreover, the first neutral point bus bar 71 and the second neutral point bus bar 72 may be provided at the inner peripheral portion of the main body 73 together with the notches 73b and 73c.

The stator 40 preferably includes twelve coil lead wires 91A to 91C, 91a to 91c, 92A to 92C, and 92a to 92c extending from a plurality of coils 43, for example. The coil lead wires 91A to 91C and 92A to 92C extend around the upper side of the stator 40, are bent to the upper side in the axial direction with the recessed portion 75b of the wire holding portion 75 as a start point, and are held by the wire holding portion 75. A width of the recessed portion 75b in the circumferential direction at the opening portion on the inside in the radial direction is smaller than a wire diameter of the coil 43. A width of the recessed portion 75b at a portion on the outside in the radial direction is equal or substantially equal to the wire diameter of the coil 43. Therefore, when the coil lead wires 91A to 91C and 92A to 92C are pushed inward from the opening portions of the recessed portions 75b, the opening portion expands due to elastic deformation, the coil lead wires 91A to 91C and 92A to 92C are accommodated in the recessed portion 75b, and then the opening portion returns to an original shape. As described above, the coil 43 is held by the wire holding portion 75. The coil lead wires 91A to 91C and 92A to 92C which are held by the wire holding portions 75 protrude from the recessed portions 75b to the upper side in the axial direction. Moreover, since the coil 43 has a certain rigidity, the coil lead wires 91A to 91C and 92A to 92C protruding from the wire holding portions 75 do not collapse or deviate greatly. The coil lead wires 91a to 91c are connected to connecting terminals 71a of the first neutral point bus bar 71. The coil lead wires 92a to 92c are connected to connecting terminals 72a of the second neutral point bus bar 72.

The coil lead wires 91A to 91C are wires that feed electric power of each of phases (U phase, V phase, and W phase) and the coil lead wires 91a to 91c are wires for the neutral point connection corresponding to the coil lead wires 91A to 91C. The coil lead wires 92A to 92C are wires that feed electric power of each of phases. The coil lead wires 92a to 92c are wires for the neutral point connection corresponding to the coil lead wires 92A to 92C.

An insulating tube 98 that is an insulating member is attached to the coil lead wire drawn out from the coil 43. The insulating tube 98 maintains insulation between the coil lead wires 91A to 91C, 91a to 91c, 92A to 92C, and 92a to 92c extending along the lower surface of the wire support member 70, and the coil 43. The coil lead wire is not limited to the insulating tube 98 as long as it can be insulated.

The bearing holder 55 has a disc or approximate disc shape and is disposed on the upper side of the stator 40. The bearing holder 55 holds the upper bearing 51. The bearing holder 55 is held by the inner peripheral surface 20c of the housing 20 by interference fit, for example. In a case of the present preferred embodiment, the bearing holder 55 is preferably fixed to the inner peripheral surface 20b by shrinkage fitting, for example. The bearing holder 55 may be fixed to the inner peripheral surface 20b of the housing 20 by press fitting, for example. Moreover, the shrinkage fitting is a fitting method included in the interference fitting.

Therefore, it is possible to fix the bearing holder 55 to the housing 20 without adding a fixing component or a fixing portion. For example, as the fixing components, there are C rings and screws. In a case where the bearing holder 55 is fixed to the housing 20 using the C ring, it is necessary to provide a groove that holds the C ring as the fixing portion on the inner peripheral surface 20b of the housing 20. In addition, similarly, also in a case of using the screw, it is necessary to provide screw holes as the fixing portions respectively provided in the housing 20 and the bearing holder 55. However, in the configuration of the present preferred embodiment, since it is not necessary to provide the fixing portion, it is possible to reduce the thickness of the housing 20. As a result, it is possible to reduce an outer diameter of the housing 20 while maintaining the inner diameter necessary for holding the stator 40, the bearing holder 55, or the like. Therefore, it is possible to reduce the number of components as a whole and to reduce the motor 10 in size.

As illustrated in FIGS. 1 and 3, the bearing holder 55 preferably includes an inner cylinder portion 55a (upper bearing holding portion) that holds the upper bearing 51, an outer cylinder portion 55b that fits to the inner peripheral surface 20b of the housing 20, and a coupling portion 55c that couples the inner cylinder portion 55a and the outer cylinder portion 55b.

The inner cylinder portion 55a includes a cylinder portion 55a1 (upper bearing cylinder portion) that fits to the outer peripheral surface of the upper bearing 51 and a receiving portion 55a2 (upper bearing receiving portion) that extends from a lower end of the cylinder portion 55a1 to the inside in the radial direction. An inner ring 51a of the upper bearing 51 is fixed to the shaft 31 by press fitting so that a lower surface of the inner ring 51a is in contact with a stepped surface of the shaft 31. An outer ring 51b of the upper bearing 51 fits to the cylinder portion 55a1 so as to be movable in the upward and downward direction. A wave washer 80 (urging member) is interposed between an upper surface of the outer ring 51b and the receiving portion 55a2 so as to bias them in the upward and downward direction.

The wave washer 80 presses the bearing holder 55 upward (in a direction in which the bearing holder 55 separates from the bottom wall portion 23) and presses the outer ring 51b downward. If the outer ring 51b is pressed downward, a ball 51c presses the inner ring 51a downward. If the inner ring 51a is pressed downward, the inner ring 52a of the lower bearing 52 is pressed downward via the shaft 31. If the inner ring 52a is pressed downward, a ball 52c presses the outer ring 52b downward.

As described above, the biasing force of the lower side of the wave washer 80 acts on the upper bearing 51 and the lower bearing 52, respectively, so that in both the bearings 51 and 52, a state where a certain biasing force is applied between the inner and outer rings and the ball is maintained and the rotor is stably supported to rotate smoothly. As described above, a state where the biasing force is applied to both the bearings 51 and 52 is referred to as a state where a preload is applied.

The coupling portion 55c preferably includes an intermediate cylinder portion 55d, an inside coupling portion 55e, and an outside coupling portion 55f. The intermediate cylinder portion 55d has a cylindrical shape and is positioned between the inner cylinder portion 55a and the outer cylinder portion 55b. The inside coupling portion 55e has an annular shape in plan view and connects a lower end of the intermediate cylinder portion 55d and an outer peripheral surface of the inner cylinder portion 55a. The outside coupling portion 55f has an annular shape in plan view and connects an upper end of the inside coupling portion 55e and an upper end of the outer cylinder portion 55b.

In FIG. 1, an end portion of the coupling portion 55c on the inside in the radial direction is bent to the lower side in the axial direction, extends to the inside in the radial direction, and is connected to the inner cylinder portion 55a. A gap is defined between the inner cylinder portion 55a and the coupling portion 55c. Therefore, the inner cylinder portion 55a and the coupling portion 55c can be elastically deformed in the radial direction. Therefore, even in a case where the bearing holder 55 and the housing 20 are expanded and contracted due to a temperature change, for example, and an excessive pressing force acts on a fitting portion between the bearing holder 55 and the housing 20, the upper bearing 51, or the like during assembly of the motor or during using the motor, the pressing force is absorbed by the elastic deformation of the inner cylinder portion 55a and the coupling portion 55c. Therefore, it is possible to reduce or prevent a decrease or increase of a fixing strength (fastening strength) between the bearing holder 55 and the housing 20, and the upper bearing 51 supports the shaft 31 so that the shaft 31 smoothly rotates.

The bearing holder 55 includes a plurality of through-holes 56a to 56c, and 57a to 57c which penetrate the bearing holder 55 in the axial direction. The plurality of the through-holes 56a to 56c, and 57a to 57c are provided at the outside coupling portion 55f.

The coil lead wires 91A, 91B, and 91C respectively pass through the corresponding through-holes 56a, 56b, and 56c, and extend to the upper side of the bearing holder 55. The coil lead wires 92A, 92B, and 92C respectively pass through the corresponding through-holes 57a, 57b, and 57c, and extend to the upper side of the bearing holder 55. Inner diameters of openings of the through-holes 56a and 56c are larger than an outer diameter of the wire holding portion 75. Therefore, connection portions between the coil lead wires 91a, 91b, and 92c for the neutral point connection, and the connecting terminals 71a and 72a are able to be kept electrically insulated from the bearing holder 55. The configuration of the through-holes 56d and 56e disposed in the bearing holder 55 is also preferably the same as that of the through-holes 56a and 56c, so that the description thereof will be omitted.

The bearing holder 55 preferably includes three recessed portions 58 on an upper surface of an outer edge portion of the bearing holder 55, for example. The recessed portion 58 is provided by a pressurizing process (for example, caulking or the like) with a pin or the like on the upper surface of the bearing holder 55. When the pressurizing process is performed on the bearing holder 55, a pressurized portion of the upper surface of the bearing holder 55 is plastically deformed, the recessed portion 58 is formed, and a pressing portion 59, which protrudes from the outside surface of the bearing holder 55 to the outside in the radial direction, is formed. When the bearing holder 55 is disposed in the housing 20, the pressing portion 59 locally presses the inner peripheral surface 20c of the housing 20. Therefore, the bearing holder 55 is fixed to the inner peripheral surface 20c of the housing 20 by shrinkage fitting and caulking.

The pressing portion 59 is disposed in a portion of the bearing holder 55 interference fitted to the housing 20, so that the pressing force between the housing 20 and the bearing holder 55 is locally improved and the fastening strength of the both members is further enhanced.

At least one of the recessed portions 58 is disposed in a vicinity of the through-holes 56a to 56c. As illustrated in FIG. 3, in the present preferred embodiment, the recessed portions 58 are disposed in the vicinity of the through-hole 56a and in the vicinity of the through-hole 56b. A distance between the through-holes 56a and 56b, and the recessed portion 58 in the vicinity thereof is within about 15° at an angle around the central axis, for example. Since the recessed portion 58 is preferably formed by plastic deformation, for example, the strength of the member at the forming position is improved. Although the strength of the bearing holder 55 tends to decrease in the vicinity of the through-holes 56a to 56c, the recessed portion 58 is disposed in the vicinity of the through-holes 56a to 56c so that it is easy to ensure the strength.

A linear expansion coefficient of a material configuring the bearing holder 55 is equal or substantially equal to a linear expansion coefficient of a material configuring the housing 20. With the configuration, since expansion amounts and contraction amounts of the housing 20 and the bearing holder 55 are equal or substantially equal to each other with respect to a temperature change after the bearing holder 55 is assembled to the housing 20, the attachment of the bearing holder 55 is unlikely to be loosened. In the case of the present preferred embodiment, both the bearing holder 55 and the housing 20 are preferably made of aluminum or an aluminum alloy.

The bus bar assembly 60 preferably includes phase bus bars 61a to 61c and 62a to 62c, and a bus bar holder 65 that holds the phase bus bars 61a to 61c and 62a to 62c. The bus bar holder preferably includes three through-holes 65A, 65B, and 65C penetrating the bus bar holder 65 in the axial direction, for example.

The bus bar holder 65 is fixed to the upper surface of the bearing holder 55. The coil lead wires 91A to 91C and 92A to 92c, which extend from the through-holes 56a to 56c, and 57a to 57c of the bearing holder 55 to the upper side, extend to the upper side of the bus bar holder 65 through the through-holes 65A to 65C of the bus bar holder 65. The coil lead wires 91A to 91C and 92A to 92C are respectively connected to the phase bus bars 61a to 61c and 62a to 62c on the upper surface of the bus bar holder 65.

The phase bus bars 61a to 61c and 62a to 62c define and function as connecting terminals to the controller 100. Since the bus bar assembly 60 is fixed to the upper surface of the bearing holder 55 which is fixed to the housing 20 with high accuracy, the phase bus bars 61a to 61c and 62a to 62c are positioned in the controller accommodating region 20A with high accuracy in the axial direction. With the configuration, connectivity between the motor 10 and the controller 100 is improved.

The stator 40 is preferably held by the inner peripheral surface 20b of the housing 20 through shrinkage fitting, for example. Since the housing 20 has a structure in which only the upper side is open, the stator 40 is inserted from the opening portion 20a of the housing 20 to the lower side and is disposed at the position of the inner peripheral surface 20b.

Here, the inner diameters of the inner peripheral surface 20d of the controller accommodating region 20A and the inner peripheral surface 20c in which the bearing holder 55 is held are larger than the inner diameter of the inner peripheral surface 20b. Therefore, during assembly, the stator 40 and the housing 20 are coaxially or substantially coaxially arranged and the stator 40 is moved in the axial direction, so that the stator 40 is able to be inserted without being in contact with the inner peripheral surfaces 20c and 20d. Even if coaxial misalignment occurs, contact is avoided if the shift amount is within an inner diameter difference between the inner peripheral surfaces 20b and 20c. In addition, when the stator 40 is shrinkage-fitted, since the housing 20 is heated, the housing 20 expands and the inner diameter of the inner peripheral surface 20b becomes somewhat larger. As a result, when the stator 40 is inserted, the outer peripheral surface of the stator 40 is unlikely to be in contact with the inner peripheral surface 20b. After completion of insertion of the stator 40, since a temperature of the housing 20 decreases and the housing 20 contracts, a fitting force between the stator 40 and the inner peripheral surface 20b increases. Therefore, the stator 40 is able to be held against the inner peripheral surface 20b without damaging both the inner peripheral surface 20d and the inner peripheral surface 20c.

In addition, the bearing holder 55 is held on the inner peripheral surface 20c of the housing 20 by the shrinkage fitting. Since the housing 20 has a structure in which only the upper side is open, the bearing holder 55 is inserted from the opening portion 20a of the housing 20 to the lower side and is disposed at the position of the inner peripheral surface 20c.

Here, in the housing 20, the inner diameter of the inner peripheral surface 20d of the controller accommodating region 20A is larger than the inner diameter of the inner peripheral surface 20c at the position to which the bearing holder 55 is fixed. Therefore, during assembly, the bearing holder 55 and the housing are coaxially or substantially coaxially arranged, and the bearing holder 55 is moved in the axial direction so that the bearing holder 55 is able to be inserted without being in contact with the inner peripheral surface 20d. That is, the bearing holder is able to be fitted without damaging the inner peripheral surface 20d at the position in which the controller 100 is accommodated. Even if coaxial misalignment occurs, contact is avoided if the shift amount is within an inner diameter difference between the inner peripheral surfaces 20c and 20d.

In addition, when the bearing holder 55 is shrinkage-fitted, since the housing 20 is heated, the housing 20 expands and the inner diameter of the inner peripheral surface 20c becomes somewhat larger. As a result, when the bearing holder 55 is inserted, the outer peripheral surface of the bearing holder 55 is unlikely to be in contact with the inner peripheral surface 20c. After completion of insertion of the bearing holder 55, since the temperature of the housing 20 decreases and the housing 20 contracts, a fitting force between the bearing holder 55 and the inner peripheral surface 20c increases. Therefore, the bearing holder 55 is able to be held against the inner peripheral surface 20c without damaging the inner peripheral surface 20d.

Therefore, in a case where the controller 100 is fitted into the inner peripheral surface 20d of the housing 20, since the inner peripheral surface 20d is not damaged, the controller 100 is able to be fixed with high accuracy. In addition, if the inner peripheral surface 20d is damaged, a scraped portion or the like of a damaged portion may adhere to the inside of the controller or the motor, which causes a problem. Therefore, even in a case where the controller 100 is fixed to the inner peripheral surface 20d by another assembly or through another member without using fitting, this configuration is convenient. In addition, since the controller 100 of the housing 20 is accommodated, it is possible to reduce the number of components and to realize reduction in size compared to a case where an accommodating member to accommodate the controller is provided as a separate component as the related art.

In addition, in the inclined surface 20e, when the bearing holder 55 and the stator 40 are inserted into the housing 20, in a case where the coaxial misalignment is caused, adjustment is performed to perform the coaxial alignment by being in contact with the inclined surface 20e if the shift amount is within the inner diameter difference between the inner peripheral surface 20d and the inner peripheral surface 20c. Therefore, since dimensional control of coaxiality during assembling operation is eased, an assembling operator or the like is able to easily perform an assembly operation.

In the motor 10, when the bearing holder 55 is fixed preferably by caulking, the bearing holder 55 is strongly pushed downward. In this case, even if an axial position of the bearing holder 55 is shifted from the attachment position, it is able to be reliably pushed to a predetermined attachment position.

The bearing holder 55 fits to the inner peripheral surface 20c of the housing 20 on the outer peripheral surface of the outer cylinder portion 55b. In the configuration, since a height of the outer cylinder portion 55b is larger than the thickness of the coupling portion 55c in the bearing holder 55, a larger contact area (or fastening length) between the bearing holder 55 and the housing 20 can be secured and a fastening strength of the bearing holder 55 is able to be increased. This configuration is convenient because the outer cylinder portion 55b can be formed by being bent in a case where the bearing holder 55 is formed by press processing of a metal plate, for example. In the present preferred embodiment, the outer cylinder portion 55b is provided in a cylindrical shape extending from the outer peripheral end of the coupling portion 55c to the lower side, but a structure, in which the coupling portion 55c is connected to the inner peripheral surface of the outer cylinder portion 55b, may be provided. Otherwise, the outer cylinder portion 55b may have a cylindrical shape extending from the outer peripheral end of the coupling portion 55c to the upper side.

Meanwhile, in the motor 10, a load applied to the rotating body is supported by both bearings 51 and 52. In the motor 10, since a torque is transmitted to the external driving mechanism through the lower side of the shaft 31, a magnitude of the load applied to the rotating body is larger in the lower bearing 52 than in the upper bearing 51. In order to cope with such a load applied by the both bearings 51 and 52, the inner ring 52a and the outer ring 52b of the lower bearing 52 are respectively fixed to the shaft 31 and the housing 20. The inner ring 51a is fixed to the shaft 31 and the outer ring 51b of the upper bearing 51 is preferably movably held by the bearing holder 55 via the wave washer 80. That is, the wave washer 80 applying a preload is provided on the upper bearing 51 side, and the inner and outer rings 52a and 52b of the lower bearing 52 are respectively fixed to the shaft 31 and the bottom wall portion 23, so that the load is applied to the lower bearing 52.

If the load applied to the lower bearing 52 increases, the load applied to the upper bearing 51 decreases, so that the load acting on the bearing holder 55 via the upper bearing 51 also decreases. Therefore, it is possible to reduce the fastening strength between the bearing holder 55 and the housing 20, which is necessary to fix the bearing holder 55 to the housing 20. If the fastening strength can be reduced, it is then possible to reduce the contact area (or fastening length) between the bearing holder 55 and the housing 20 to reduce or prevent an increase in the total dimension of the motor 10 in the upward and downward direction such that the motor is miniaturized. In addition, since the fastening strength between the bearing holder 55 and the housing 20 is able to be reduced, it is possible to reduce or prevent distortion to the housing 20. If the distortion of the housing 20 is reduced or prevented, the controller 100 is able to be accurately accommodated in the housing 20.

In addition, since magnitudes of required load capacities are different in the both bearings 51 and 52, bearing sizes corresponding to the magnitudes of the required load capacities are respectively used. Therefore, an optimal bearing is selected for the both bearings 51 and 52.

Next, a preferred embodiment of an assembling method of the motor 10 will be described. First, the housing 20 is disposed on a predetermined seat so that the bottom wall portion 23 is positioned on the lower surface and the opening portion 20a is positioned on the upper side. In addition, the lower bearing 52 is inserted to the lower side via the opening portion 20a, is pressed into the lower bearing holding portion 23a, and the upper end of the cylinder portion 23b is caulked in the inner diameter direction. Next, the housing 20 is heated to expand the cylinder portion 21. Therefore, the inner diameter of the cylinder portion 23b enlarges. In this state, the stator assembly is inserted to the lower side via the opening portion 20a to be fitted to the inner peripheral surface 20b. When the temperature of the housing 20 lowers, the cylinder portion 21 contracts, the fastening strength thereof increases, and thereby the shrinkage fitting is completed.

On the other hand, a rotor assembly defined by the rotor 30, the upper bearing 51, the bearing holder 55, and the wave washer 80 is separately assembled. In this case, since the bearing holder 55 and the upper bearing 51 are merely fitted so as to be movable in the upward and downward direction, they are easily disassembled. However, the receiving portion 55a2 of the bearing holder 55 is placed above the upper bearing 51 and the shaft 31 is placed along the upward and downward direction, so that the rotor assembly is temporarily placed on a predetermined seat. Since the cylinder portion 55a1 and the receiving portion 55a2 are caught on the outer ring 51b via the wave washer 80 due to the weight of the bearing holder 55, they are able to be temporarily placed without being disassembled.

Next, the cylinder portion 21 is expanded by reheating around the upper side of the cylinder portion 21 of the housing 20. Therefore, the inner diameter of the upper side of the cylinder portion 23b is enlarged. In this state, the lower surface of the outer ring 51b of the upper bearing 51 of the rotor assembly, or the upper side of the shaft 31 is gripped by using a gripper, and is inserted to the lower side via the opening portion 20a of the housing 20. In this case, when the lower end of the shaft 31 reaches the lower bearing 52, the shaft 31 is pressed to the lower side and the shaft 31 is pressed into the inner ring 52a of the lower bearing 52. At the same time, the bearing holder 55 is in contact with the shelf surface 20f and is fitted to the inner peripheral surface 20c. When the temperature of the housing 20 decreases, the cylinder portion 21 contracts, the fastening strength thereof increases, and thereby the shrinkage fitting is completed. Thereafter, the upper surface of the outer peripheral portion of the bearing holder 55 is caulked by a pin or the like to form the recessed portion 58. Since the pressing portion 59 presses the inner peripheral surface 20c to the outside in the radial direction by the formation of the recessed portion 58, the fastening strength of the both members is further enhanced.

When the rotor assembly is inserted into the housing 20, positioning of each of the coil lead wires 91A to 91C, 91a to 91c, 92A to 92c, and 92a to 92c, and each of the through-holes 56a to 56d and 57a to 57d is performed in the circumferential direction while aligning coaxial axes of the both members so as to coincide with each other.

Next, the bus bar assembly 60 is disposed on the upper surface of the bearing holder 55 via the opening portion 20a of the housing 20. In this case, positioning of each of the through-holes 65A to 65C of the bus bar assembly 60 and each of the coil lead wires 91A to 91C and 92A to 92C is performed so as to coincide with each other. Thereafter, when the coil lead wires 91A to 91C and 92A to 92C, and the phase bus bars 61a to 61c and 62a to 62c are respectively welded, the fixing of the bus bar assembly 60 is completed.

In the series of assembling method described above, since all the lower bearing 52, the stator assembly, the rotor assembly, and the bus bar assembly 60 are able to be assembled by being inserted into the housing 20 from the same direction while maintaining the arrangement state of the housing 20, workability of assembly is good.

The reason why such an assembling method is able to be realized is as follows. Since the receiving portion 23c of the lower bearing holding portion 23a is on the lower side of the cylinder portion 23b, the lower bearing 52 is able to be inserted into the lower bearing holding portion 23a via the opening portion 20a. Since the inner diameters of the inner peripheral surfaces 20b, 20c, and 20d of the cylinder portion 21 of the housing 20 are gradually decreased so as to separate from the opening portion 20a, even in a configuration in which the bottom wall portion 23 of the housing 20 is integrated with the cylinder portion 21, the stator assembly and the rotor assembly are able to be inserted up to a predetermined portion via the opening portion 20a. Since the rotor assembly has a configuration in which the receiving portion 55a2 of the bearing holder 55 is positioned on the upper side of the upper bearing 51 and the inner ring 51a is fixed to the shaft 31, even in a configuration in which the outer ring 51b is held on the bearing holder 55 to be movable in the upward and downward direction, the rotor assembly is able to be gripped without being disassembled and is able to be inserted into the housing 20 via the opening portion 20a.

Figure 5:
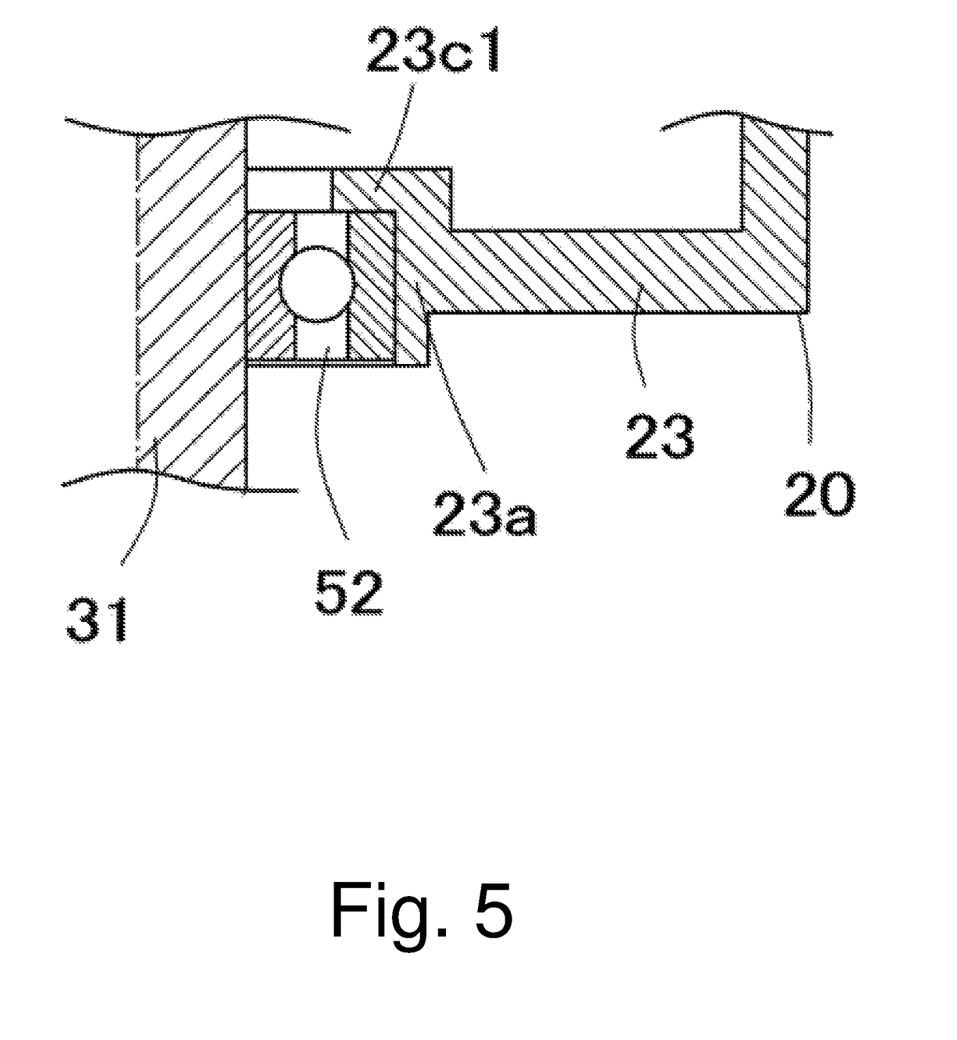
FIG. 5 is a sectional view of a main portion illustrating a modification example of the preferred embodiment of the present invention illustrated in FIG. 1.

Next, a modification example of the lower bearing holding portion 23a of a preferred embodiment of the present invention will be described. In the lower bearing holding portion 23a of the above-described preferred embodiments, the receiving portion 23c is provided on the lower side of the cylinder portion 23b, whereas in the modification example, as illustrated in FIG. 5, a receiving portion 23c1 (second lower bearing receiving portion) is provided on an upper side of a cylinder portion 23b. A lower end of the cylinder portion 23b is caulked in the inner diameter direction. An outer ring 52b is pressed into the cylinder portion 23b and is pinched together with the receiving portion 23c1 by the caulking to be firmly fixed.

In an assembling method in the configuration, since the lower bearing 52 is inserted into the bearing holding portion 23a from the lower surface of the bottom wall portion 23 in the housing 20, it is difficult to assemble each member by inserting each member from the same direction while maintaining the arrangement state of the housing 20 as in the configuration illustrated in FIG. 1 or the like. However, in the configuration in which the lower bearing 52 is inserted from the lower surface of the bottom wall portion 23, since it is unnecessary to pay attention so that the lower bearing 52 is not in contact with the inner peripheral surface of the cylinder portion 21, workability in the insertion operation of the lower bearing 52 is good. Therefore, since the inner diameter of the cylinder portion 21 is small, a dimension of the cylinder portion 21 in the upward and downward direction is long, or the like, the configuration of the modification example is suitable for a case where the lower bearing 52 is unlikely to be inserted via the opening portion 20a. In the assembling method of the configuration, the housing 20 is disposed so that the bottom wall portion 23 faces upward, the lower bearing 52 is fixed, and then the housing 20 is reversed, and thereafter, the same assembling method as described above is performed.

In addition, in the configuration illustrated in FIG. 1, or the like, although the inner diameter difference between the inner peripheral surfaces 20c and 20d is provided in the cylinder portion 21 of the housing 20, it is also possible to have the same diameter.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A motor that transmits a predetermined torque to an external driving mechanism, the motor comprising:
  a rotor that includes a shaft centered on a central axis extending in an upward and downward direction;
  a stator that is disposed to face the rotor in a radial direction;
  an upper bearing that supports an upper side of the shaft;
  a lower bearing that supports a lower side of the shaft;
  a bearing holder that holds the upper bearing; and
  a housing that accommodates the rotor, the stator, and the bearing holder, and opens to an upper side, wherein
  a lower end of the shaft projects to an outside from the housing and transmits a predetermined torque to the external driving mechanism,
  the housing includes:
    a housing cylinder portion that accommodates the rotor, the stator, and the bearing holder,
    a housing bottom portion that closes an opening of the housing cylinder portion on a lower side, and
    a housing shelf surface that faces an opening side of the housing and extends in a circumferential direction in an inner peripheral surface of the housing cylinder portion,
  the housing cylinder portion includes a controller accommodating region that accommodates at least a portion of a controller electrically connected to the stator on an upper side from the bearing holder,
  the bearing holder includes an upper bearing holding portion that is held on the inner peripheral surface of the housing cylinder portion, is in contact with the housing shelf surface, and holds the upper bearing,
  the upper bearing holding portion includes:
    an upper bearing cylinder portion that fits to an outer ring of the upper bearing, and
    an upper bearing receiving portion that extends to an inside in the radial direction on an upper side of the upper bearing cylinder portion,
  the housing bottom portion includes a lower bearing holding portion that holds the lower bearing,
  in the upper bearing:
    an inner ring of the upper bearing is fixed to the shaft, and
    the outer ring of the upper bearing is movable in the upward and downward direction with respect to the upper bearing holding portion, and an urging member that performs urging in the upward and downward direction is positioned between an upper surface of the outer ring and the upper bearing receiving portion,
  in the lower bearing:
    an inner ring of the lower bearing is fixed to the shaft, and
    an outer ring of the lower bearing is fixed to the lower bearing holding portion,
  the bearing holder includes an inside cylinder portion that holds the bearing, an outside cylinder portion that fits to the inner peripheral surface of the housing cylinder portion, and a coupling portion that couples the inside cylinder portion and the outside cylinder portion together, and the coupling portion includes an intermediate cylinder portion that is positioned between the inside cylinder portion and the outside cylinder portion, an inside coupling portion that couples a lower end of the intermediate cylinder portion and the inside cylinder portion, and an outside coupling portion that couples an upper end of the intermediate cylinder portion and the outside cylinder portion.

2. The motor according to claim 1, wherein the lower bearing holding portion includes:
a lower bearing cylinder portion that fits to the outer ring of the lower bearing, and
a first lower bearing receiving portion that extends to the inside in the radial direction on a lower side of the lower bearing cylinder portion, and
the outer ring of the lower bearing is in contact with the first lower bearing receiving portion.

3. The motor according to claim 1, wherein the lower bearing holding portion includes:
a lower bearing cylinder portion that fits to the outer ring of the lower bearing, and
a second lower bearing receiving portion that extends to the inside in the radial direction on an upper side of the lower bearing cylinder portion, and
the outer ring of the lower bearing is in contact with the second lower bearing receiving portion.

4. The motor according to claim 1, wherein a load capacity of the lower bearing is larger than a load capacity of the upper bearing.

5. The motor according to claim 1, wherein an inner diameter of the housing in the controller accommodating region is larger than an inner diameter of the housing at a position to which the bearing holder is attached.

6. The motor according to claim 1, wherein the housing includes an inclined surface that is in contact with an inner peripheral surface of the controller accommodating region and an inner peripheral surface at a position to which the bearing holder is attached in the axial direction.

7. The motor according to claim 1, wherein the inner diameter of the housing at a position to which the bearing holder is attached is larger than the inner diameter of the housing at a position in which the stator is accommodated.

8. The motor according to claim 1, wherein a linear expansion coefficient of a material of the housing is equal or substantially equal to a linear expansion coefficient of a material of the bearing holder.

9. The motor according to claim 1, wherein the bearing holder includes a recessed portion and a pressing portion that is positioned on an outside of the recessed portion in the radial direction and presses the inner peripheral surface of the housing at an outer edge portion of an upper surface of the bearing holder.

10. The motor according to claim 9, wherein the bearing holder includes a through-hole that penetrates the bearing holder in the axial direction, and at least one recessed portion is disposed adjacent to the through-hole.

11. The motor according to claim 10, further comprising:
a bus bar assembly on the upper side of the bearing holder, wherein
the bus bar assembly includes a bus bar that is connected to a wiring extending from the stator via the through-hole of the bearing holder and a bus bar holder that holds the bus bar.

12. The motor according to claim 1, further comprising:
a controller positioned such that a portion or an entirety of the controller is accommodated in the controller accommodating region.

13. A motor comprising:
a rotor that includes a shaft centered on a central axis extending in an upward and downward direction;
a stator that is disposed to face the rotor in a radial direction;
a bearing that supports the shaft;
a bearing holder that holds the bearing; and
a housing that accommodates the rotor, the stator, and the bearing holder, and opens to an upper side, wherein
the housing includes:
a controller accommodating region that accommodates at least a portion of a controller electrically connected to the stator on an upper side from the bearing holder, and
a shelf surface that faces an opening portion of the housing and extends in a circumferential direction in an inner surface of the housing,
an inner diameter of the housing in the controller accommodating region is larger than an inner diameter of the housing at a position to which the bearing holder is attached, and
the bearing holder is in contact with the shelf surface and includes a recessed portion and a pressing portion that is positioned on an outside of the recessed portion in the radial direction and presses the inner peripheral surface of the housing at an outer edge portion of an upper surface of the bearing holder.

14. The motor according to claim 13, wherein the housing includes an inclined surface that is in contact with an inner peripheral surface of the controller accommodating region and an inner peripheral surface at a position to which the bearing holder is attached in the axial direction.

15. The motor according to claim 13, wherein
the shelf surface that faces the opening portion of the housing and extends in the circumferential direction is provided in the inner surface of the housing, and
the bearing holder is in contact with the shelf surface.

16. The motor according to claim 13, wherein the inner diameter of the housing at the position to which the bearing holder is attached is larger than an inner diameter of the housing at a position in which the stator is accommodated.

17. The motor according to claim 13, wherein a linear expansion coefficient of a material configuring the housing is equal or substantially equal to a linear expansion coefficient of a material configuring the bearing holder.

18. The motor according to claim 13, wherein the bearing holder includes a through-hole that penetrates the bearing holder in the axial direction, and at least one recessed portion is disposed in a vicinity of the through-hole.

19. The motor according to claim 18, further comprising:
a bus bar assembly on the upper side of the bearing holder, wherein
the bus bar assembly includes a bus bar that is connected to a wiring extending from the stator via the through-hole of the bearing holder and the bus bar holder that holds the bus bar.

20. The motor according to claim 13, wherein the bearing holder includes an inside cylinder portion that holds the bearing, an outside cylinder portion that fits to the inner peripheral surface of the housing cylinder portion, and a coupling portion that couples the inside cylinder portion and the outside cylinder portion.

21. The motor according to claim 20, wherein the coupling portion includes an intermediate cylinder portion that is positioned between the inside cylinder portion and the outside cylinder portion, an inside coupling portion that couples a lower end of the intermediate cylinder portion and the inside cylinder portion, and an outside coupling portion that couples an upper end of the intermediate cylinder portion and the outside cylinder portion.

22. The motor according to claim 13, further comprising:
a controller positioned such that a portion or an entirety of the controller is accommodated in the controller accommodating region.

* * * * *